(12) United States Patent
Peterffy et al.

(10) Patent No.: US 12,073,469 B2
(45) Date of Patent: *Aug. 27, 2024

(54) SYSTEMS AND METHODS FOR DATA NORMALIZATION FOR USE IN SCORING AND BALANCING A PORTFOLIO

(71) Applicant: INTERACTIVE BROKERS LLC, Greenwich, CT (US)

(72) Inventors: William Peterffy, Eldorado Springs, CO (US); Emerito Medalla, Briarcliff Manor, NY (US); Sanjoy Ghosh, Lexington, MA (US); Yatharth Manuja, London (GB); Konstantine Smaguine, Cos Cob, CT (US); Yakov Gorodnitsky, Darien, CT (US)

(73) Assignee: INTERACTIVE BROKERS LLC, Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,360

(22) Filed: Aug. 25, 2023

(65) Prior Publication Data

US 2023/0410207 A1    Dec. 21, 2023

Related U.S. Application Data

(63) Continuation of application No. 17/204,863, filed on Mar. 17, 2021, now Pat. No. 11,741,547.

(51) Int. Cl.
| | |
|---|---|
| *G06Q 40/06* | (2012.01) |
| *G06F 16/23* | (2019.01) |
| *G06Q 40/04* | (2012.01) |

(52) U.S. Cl.
CPC ......... *G06Q 40/06* (2013.01); *G06F 16/2379* (2019.01); *G06Q 40/04* (2013.01)

(58) Field of Classification Search
CPC ..... G06Q 40/06; G06Q 40/04; G06F 16/2379
See application file for complete search history.

(56) References Cited

U.S. PATENT DOCUMENTS

| | | | | |
|---|---|---|---|---|
| 2012/0316916 | A1* | 12/2012 | Andrews ............... | G06Q 50/01 |
| | | | | 705/7.29 |
| 2016/0117774 | A1* | 4/2016 | Bateman ............... | G06Q 40/06 |
| | | | | 705/36 R |

(Continued)

FOREIGN PATENT DOCUMENTS

| | | | | | |
|---|---|---|---|---|---|
| CA | 2862273 | C | * | 7/2022 | ......... G06Q 10/0635 |
| JP | 2018109936 | A | * | 7/2018 | |
| WO | WO-2016118939 | A1 | * | 7/2016 | ............ G06Q 40/06 |

OTHER PUBLICATIONS

ISDA.:Overview of ESG-related Derivative Products and Transactions, Jan. 2021, pp. 1-18 (Year: 2021).*

(Continued)

*Primary Examiner* — Bijendra K Shrestha
(74) *Attorney, Agent, or Firm* — Brown Rudnick LLP; Ian G. DiBernardo

(57) ABSTRACT

A computer implemented method of evaluating market participants' stock portfolios and distributing actionable environmental, social and governance (ESG) stock data over a network to multiple remote market participant terminals allowing market participants to easily rebalance their portfolios so that their investments align with their personal values or social tolerances. The method comprises receiving from multiple sources non-standardized electronic ESG data for a plurality of securities, mapping, scaling and normalizing the data to present a final impact score that the market participant can act upon.

20 Claims, 2 Drawing Sheets

(56) References Cited

U.S. PATENT DOCUMENTS

2019/0362427 A1* 11/2019 Chen .................. G06Q 10/067
2022/0027814 A1* 1/2022 Lalit .................. G06Q 10/0639

OTHER PUBLICATIONS

OECD: ESG Investing: Practices, Progress and Challenge, 2020, pp. 1-88 (Year: 2020).*
Cayon et al.: Sin Stocks and ESG Scores: Does the nature of your business really matter? Feb. 2021, Journal of International Studies, pp. 1-11 (Year: 2021).*

* cited by examiner

SYSTEMS AND METHODS FOR DATA NORMALIZATION FOR USE IN SCORING AND BALANCING A PORTFOLIO

RELATED APPLICATIONS

This application is a continuation of U.S. application Ser. No. 17/204,863, filed on Mar. 17, 2021 and issued on Aug. 29, 2021 as U.S. Pat. No. 11,741,547, each of which is incorporated by reference herein in its entirety.

BACKGROUND

Field of the Invention

The embodiments of the present invention relate to automated systems and methods for rebalancing a portfolio and, more specifically, to rebalancing a portfolio based upon "impact scoring", such as environmental, social and governance (ESG) scoring, derived from multiple data sets.

Description of Related Art

Traditionally, a market participant that desired to create a portfolio of securities based their decisions on information related to the economic health and stability of the companies that they were investing in. More recently, market participants (also referred to as investors herein) have begun to also look at the social and environmental impact companies have. One rationale behind such analysis is that a company's relative favorable social or environmental impact will result in better success in the market. Additionally, performance of such an analysis will more closely align the philosophy of companies in the investor's portfolio with the investor's philosophy. One framework that is used to rate a company's social and environmental impact is the company's devotion to ESG principles. Companies that value these principles are said to have a strong ESG record, while others who are less careful have weaker ESG records.

There are a variety of organizations that help investors determine a company's ESG record. Many of these companies utilize different metrics within the ESG framework to provide scores or other grading criteria related to ESG issues. One such company is the Sustainability Accounting Standards Board ("SASB") that identifies a subset of ESG issues that it deems most relevant to performance across a variety of industries.

While use of the ESG framework has gained popularity, access to ESG data in a manner that allows an individual market participant to meaningfully analyze the ESG data and translate it into actionable management of their portfolio has remained elusive. This is based on a variety of factors that include different data inputs and scoring methodologies and a lack of understanding of how each methodology translates to an investor's personal philosophies. Moreover, having different ESG data from various providers creates a cacophony of information that cannot be easily mapped, translated or harmonized. Even if a market participant is able to access and understand the scoring methodologies, there is no way for them to easily rebalance their portfolio by seamlessly swapping securities based on an ESG score or otherwise acting on the scoring. The lack of uniform ESG standards complicates matters further.

Thus, a need exists for an improved method and system for evaluating and balancing a market participant's portfolio based on actionable ESG data.

SUMMARY

Various embodiments of the invention provide for a method of evaluating market participants' stock portfolios and distributing actionable ESG stock data over a network to multiple remote market participant terminals. The method comprises receiving from multiple sources non-standardized electronic ESG data for a plurality of stocks, wherein the ESG data include multiple source ESG parameters and the ESG data from each of two or more sources include at least one different ESG parameter. The method further comprises establishing user-selected ESG parameters, the user-selected ESG parameters being different than one or more of the source ESG parameters, associating the ESG data of the multiple sources with the user-selected ESG parameters by mapping the ESG parameters of each source to the user-selected parameters and receiving from users an indication of importance for one or more of the user-selected parameters. The method further comprises generating an ESG score for the stock portfolio of a user based on the ESG data of at least the two or more sources, the mapping of ESG source parameters to the user-selected parameters and the user indication of importance of the user-selected parameters and identifying, based on the ESG data of at least the two or more sources, the mapping of ESG parameters to the user-selected parameters, the user indication of importance of the user-selected parameters, and industry sector information, one or more alternative securities to an identified security in the user portfolio, to improve the ESG score for the portfolio.

In one embodiment, the method also includes receiving updated ESG data from one or more sources or receiving additional ESG data from an additional source, the additional ESG data having ESG source parameters and associating the ESG source parameters of the additional ESG data with the user-selected ESG parameters by mapping the ESG source parameters of the additional ESG data to the user-selected parameters and automatically updating ESG scores based on the updated ESG data or the additional ESG data.

In one embodiment the method also comprises receiving a single user input from the user trading terminal for a buy order for one of the alternative securities and a sell order for the identified security; and in response to the single user input, automatically generating an electronic buy order for the one alternative security and an electronic sell order for the identified security.

BRIEF DESCRIPTION OF THE DRAWINGS

The foregoing as well as the following detailed description of preferred embodiments of the application, will be better understood when read in conjunction with the appended drawings wherein like reference numerals refer to like components. For the purposes of illustrating the system and method of the present application, there is shown in the drawings preferred embodiments. It should be understood, however, that the application is not limited to the precise arrangement, structures, features, embodiments, aspects, and systems shown, and the arrangements, structures, features, embodiments, aspects and systems shown may be used singularly or in combination with other arrangements, structures, features, embodiments, aspects and systems.

The drawings are not necessarily drawn to scale and are not in any way intended to limit the scope of this invention, but merely to clarify a single illustrated embodiment of the invention. In the drawings.

DETAILED DESCRIPTION OF EMBODIMENTS

In general, certain computer-implemented embodiments of the invention permit a market participant to easily rebalance their portfolios so that their investments align with their personal values or social tolerances. The market participant can manage their portfolios and the positions or securities that make up that portfolio. Each of the securities and the portfolio as a whole can be ranked based on preferences set by a market participant that reflect the market participant's core values. Once the market participant's preferences are established, ESG related data from multiple sources are mapped, scaled and normalized and used to derive composition scores for individual companies, as well as an aggregate portfolio score. Based on such standardized data, embodiments thus provide market participants with an automated system for easily analyzing their portfolios and, further, rebalancing it based on their personal values or social tolerances. In this regard, embodiments provide an automated swap trade feature, whereby the system provides a market participant one or more securities as alternatives to an existing holding in the market participant's portfolio based on the relative impact scores of the alternative securities versus the existing position and, upon receiving a single user input, automatically enters two trades-one to sell the existing holding and one to buy a corresponding of equal value of the alternative security, thereby improving the market participant's overall portfolio impact score. In one embodiment the two trades are equal in value prior to any commission or other trading fee is deducted.

As will be apparent to those skilled in the art based on the present disclosure, various embodiments of the present invention offer one or more advantages over, and solve one or more business and technical problems associated with, prior trading systems and methods. For example, embodiments of the present invention enable market participants to meaningfully have access to a portfolio score that allows it to seamlessly rebalance its portfolio according to his or her social tolerances. The system allows the market participant to more meaningfully analyze the ESG scores in its portfolio and easily submit trades to improve such scores.

Figure 1:
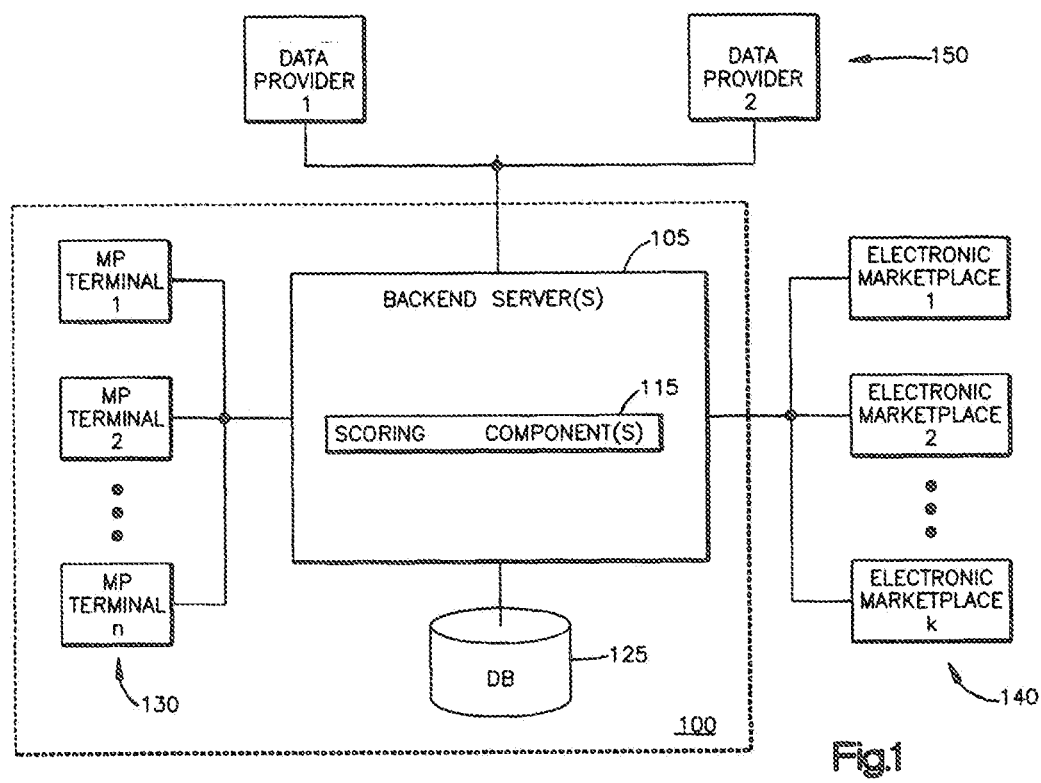
FIG. 1 depicts an exemplary schematic block diagram of a trading network according to one embodiment of the present invention.

Various embodiments of the present invention will now be described in greater detail. Turning first to FIG. 1, there is shown an embodiment of a computer-implemented trading system 100 generally comprising one or more backend servers 105 and market participant terminals (1, 2, . . . n) 130. In general, the backend servers 105 serve as an intermediary between market participant terminals 130 and electronic marketplaces (1, 2, . . . k) 140, receiving trade order details from the market participant terminals 130, processing them, and submitting trade orders based thereon to the electronic marketplaces 140. The backend servers 105 also receive data from data providers 150 and map, scale and normalize such data. The backend servers 105 also receive order execution information from the electronic marketplaces 140, process the execution information, and provide execution details to the market participant terminals 130.

It is to be understood that the present invention is applicable to various types of securities, such as stocks, bonds and other financial instruments and products. Accordingly, the electronic marketplaces 140 may include any market or exchange for the trading of securities, such as that provided by the New York Stock Exchange, Euronext, Chicago Mercantile Exchange (CME), Nasdaq, New York Mercantile Exchange, FTSE, Electronic Communications Networks (ECNs), liquidity pools such as those operated by POSIT and LIQUIDNET, and others.

In an exemplary embodiment, the system architecture includes hardware, system software and application software. The system hardware may include one or more mainframe computers each having at least one processor and memory. The system hardware may additionally include other components such as storage and network components (i.e., servers, routers, switches, data buses, databases, etc.), networked to the mainframe computer and any external connections as would be understood by a person of ordinary skill in the art having the benefits of the present disclosure.

In providing the functions described herein, the backend servers 105 include processors that operate in accordance with software, firmware or other computer programs stored on a computer readable medium, such as read only memory, hard disks (e.g., in a RAID configuration), tape drives, flash memories, optical disks, network storage or other known or hereafter developed technology. The servers 105 (and the processors thereof) may be configured to operate in accordance with software, which may be configured or organized to comprise various functional components or modules. In addition to those components of electronic trading systems and communication systems generally known to those skilled in the art, servers 105 may include one or more scoring components 115. In general, the scoring components 115 provide the functionality to generate scores based on ESG data received from data providers 150 and the portfolios of and impact values chosen by market participant 130.

In performing the functions and operations described herein, servers 105 also access records and data in computer memory, such as random access memory, hard disks (e.g., in a RAID configuration), tape drives, flash memories, optical disks, network storage or other known or hereafter developed technology. By way of example, backend servers 105 include or are in communication with database 125. As will be apparent to those skilled in the art based on the description herein, database 125 may comprise a relational database having multiple related tables. In the present embodiment, database 125 stores order parameters typically stored in electronic trading systems and may include an account table, trade tables, marketplace tables, a positions table. Additionally, database 125 may store scores and related information for portfolios and individual positions (securities). Such information may be received from data providers 150 or be information created by scoring component 115.

In general, the account table stores information that identifies each market participant account, as identified by a unique account identifier (ID), and the associated market participant, including, for example, contact information, bank information, trading limits and any information deemed relevant, as well as an indication of the market participants (and the associated market participant terminals 130) trading under each account. For example, the system 100 may store limits restricting market participants to trade in specific marketplaces and/or at specific times. Each market participant terminal 130 may be identified by a unique terminal ID and/or IP address, and each market participant may be identified by a unique user name and/or password, which the market participant uses to log into the market participant terminal 130. The backend servers 105 may use the terminal ID and the user name and/or password to identify and associate incoming orders as being transmitted by a particular market participant terminal 130 and market participant, to process orders and to send outgoing messages to the appropriate market participant terminal 130. The account holders and market participants may include, for example, retail and individual investors, institutional investors or other entities.

The database 125 may also include one or more tables for storing account and market participant positions. Such tables may include an indication of the aggregate positions in each security for each portfolio and may also include ESG scoring information related to the portfolio and/or positions within the portfolio. Tables can also include data and ESG scores received from ESG data providers 150 and portfolio and individual company/security scores that are calculated utilizing scoring components 115.

It should be understood that the foregoing tables are merely illustrative, and that more or less information may be stored and tracked by the servers 105 and/or system 100 as may be desired. Furthermore, such data may be stored in any grouping and in any number of databases and/or tables, including storing information remote from the servers, such as at the market participant terminals 130. Additionally, rather than storing all information, certain information may be generated in real time based on other information available to the system 100.

It should also be recognized that the computer systems described herein, such as the market participant terminals 130, servers 105, electronic marketplaces 140 and data provider systems 150, generally include one or more computers that are programmatically structured to perform the functions required to manage their operations, as described herein. One skilled in the art will recognize that the computer systems may, as a matter of design choice, include any number and configurations of discrete computers and databases, which may be used separately or in tandem to support the traffic and processing needs necessary in operation at one time. In one embodiment, the backend servers 105, if multiple servers are used, are configured using a round-robin configuration to handle market participant and/or electronic marketplace. Although not depicted in the figures, the one or more computers of the computer systems generally include such components as are ordinarily found in such computer systems, including but not limited to processors, RAM, ROM, clocks, hardware drivers, associated storage, and the like.

In general each market participant terminal 130 may be a programmed general purpose computer, specialized computer or other processing device (such as a PDA or other mobile device) that operates according to software, firmware or other program stored on a computer readable medium to provide the functions described herein. For example, each market participant terminal 130 may be programmed to provide a number of graphical user interfaces (GUIs) to the market participants such that market participants can interact with and use the functions provided by system 100 and servers 105. These GUIs may include account or position information, pricing tables, charts, market data, scoring data and other information desired by the market participant or stored by the system 100.

Furthermore, each of the servers 105, market participant terminals 130, electronic marketplaces 140 and data provider systems 150 described herein may have a network connection over which each communicates with the other components as described herein. The network connection may be a gateway interface to the Internet or any other communications network through which the systems can communicate with other systems and user devices. The servers 105 may communicate with each of the other types of components over the same network, such as the Internet, or over separate networks, such as the Internet, WANs, LANs, VPNs or other communication link. Network connections may connect to the communications network through use of a conventional modem (at any now know or later developed baud rate), an open line connection (e.g., digital subscriber lines or cable connections), satellite receivers/transmitters, wireless communication receivers/transmitters, or any other network connection device as known in the art now or in the future. It will be understood by those skilled in the art that the display of user interfaces and the provision or display of information to a user may be accomplished within the scope of the present invention in a number of ways, including, but not limited to, the serving or pushing of interfaces to a user, exposing one or more application programming interfaces (APIs) to the market participant terminals 130, and the local storing and/or generation of interfaces at a market participant terminal 130 upon a trigger received from the servers 105 or input from the market participant at the market participant terminal 130. Also, the backend servers 105 may communicate with the market participant terminals 130 electronic marketplaces 140 and data provider systems using any protocol or format. In certain embodiments, the computer systems involved preferably communicate using a messaging system in which information to be communicated is contained within one or more messages, which may be packetized, encrypted or formatted, as necessary to address specific bandwidth or security concerns. The messages may use XML or other message types and may be based off of one or more message standards, such as FIX in the financial industry, or be based on a proprietary protocol or format.

In an exemplary embodiment, the system and method include a plurality of user computers through which the market participant can process their trades. The system preferably includes one or more computer systems that can include one or more software modules, databases and related database management systems. Computers can also typically connect to or include an order management system ("OMS") or execution management system ("EMS") to assist in the submission and execution and trading of securities. Various input and output devices are preferably provided with the consumer including, by way of non-limiting example, a display (e.g., liquid crystal display (LCD)), and an input device (e.g., a keyboard, mouse, touch pad, or light pen). Preferably, an Application Programming Interface (API) or other specialized computer hardware or software that is used to connect market participants to an electronic trading system and perform certain tasks automatically. The specific hardware combination/configuration is not crucial to the instant invention, and may vary as a matter of design choice within the functional parameters disclosed herein.

It will be understood that reference to a "connection," "communication" or "link" is not intended to mean that the various computers be in constant connection or communication, but rather be capable of communication upon establishment of a connection. For example, a market participant terminal 130 may from time-to-time "connect" to servers 105 using an unsecured Internet connection to check market prices or related information.

In one embodiment of the present invention, unstructured data is collected from ESG data providers 150 to compute scores related to the social and environmental impact that different companies in a market participant's portfolio have. This can be within common frameworks such as ESG and SASB, among others. Two of such data providers are Refinitiv and Truvalue. Although the below discussion relates to a specific scoring system, it should be appreciated by one of ordinary skill in the art that embodiments of the present invention can be applied generally to other data sets as well. In certain scoring systems, the scores are calculated based on company generated resource and other third-party resources, which can include annual reports, regulatory filings, blogs, publications and social media postings. For example, Refinitiv (https://www.refinitiv.com/en/sustainable-finance/esg-scores) has ten ESG category scores that are based on a company's own disclosures. These categories are further aggregated into three ESG "pillar" scores. Conversely, Truvalue (https://truvaluelabs.com/trends/esg-integration), has twenty-six categories (based on SASB) and creates scores based not on a company's own disclosures, but rather on trade blogs, industry publications and social media using natural language processing and artificial intelligence algorithms to create scores for the categories. Although these scores have limited usefulness as standalone data sets, additional value can be created by aggregating both scores. However, such aggregation is not readily possible and requires, particularly in an electronic and real time trading environment, additional processing. Such issues are exacerbated when additional data sets and scores are sought to be added. More specifically, to use such multiple, disparate sources of data, such data need to be mapped, scaled and normalized so that the market participant can evaluate the information in a manner that allows them to intelligently rebalance their portfolio.

Utilizing the scoring system of the instant invention a market participant is able to personalize their investment experience by selecting the values they want companies to support and practices they want companies to avoid. Once the parameters have been established by the market participant, the portfolio can be graded to show how different positions are either boosting or diminishing their portfolio grade. Additionally, companies may be "red flagged" if they engage in the practices that the market participant wants to avoid. Having this information allows the market participant to rebalance their portfolio in a manner that better reflects their social and environmental priorities.

In order to prioritize the market participant's values, a market participant chooses from a list of "impact values" that can be designated as "Important" or "Very Important". How many of these selections are made impact how the value score is calculated. Choosing too many impact values will weaken the effect that any one selection may have in the calculation. In one embodiment these impact values include the following thirteen principles that are significant factors to social and environmental impact of business conduct:

| | |
|---|---|
| 1. | Sustainable Product Lifecycle |
| 2. | Mindful Business Models |
| 3. | Clean Air |
| 4. | Pure Water |
| 5. | Ocean Life |
| 6. | Land Health |
| 7. | Ethical Leadership |
| 8. | Consumer Safety |
| 9. | Company Transparency |
| 10. | LGBTQ Inclusion |
| 11. | Gender Equality |
| 12. | Racial Equality |
| 13. | Fair Labor & Thriving Communities. |

Additionally or alternatively, the market participant can select from ten practices that they would want a company to avoid. These selections are not factored into the value score, but rather companies that engage in such selected practices can be red flagged for the market participant. These practices include Animal Testing, Business Ethics Controversies, Corporate Political Spending and Lobbying, Energy Intensive, Fossil Fuels, Greenhouse Emissions, Hazardous Waste, High Water Usage, Tobacco, Alcohol and Gambling, and Weapons and Gun Manufacturers.

Once the market participant has selected the values that he or she supports or opposes, the system grades the market participant's portfolio. Based on the scoring method, each company can be rated as "aligns with", "neutral toward", or "conflicts with" the market participant's portfolio impact score. As referred to herein, "impact score" generally refers to a normalized and distributed ESG score that blends the scoring of the ESG data providers to arrive at a single score that reflects the specific social and environmental impact value for that security or portfolio.

The scoring is personalized for the market participant in such a manner that prioritizes the selections made by the market participant. This is derived based on an underlying ESG metric that aligns to a specific impact value (e.g., Ocean Life) and is then mapped, scaled and normalized based on the market participant's preferences. The process starts with defining a target benchmark when the market participant's preferences are established. A company's ESG performance is then measured against this benchmark to determine if they are exceeding expectations (Aligns with), performing far below expectations (Conflicts with) or just meeting expectations (is Neutral toward). Each company's "Impact Effect" and portfolio weight can then be used to derive the portfolio score.

Each market participant can also select preferences for multiple social and environmental values. These preferences are used to establish benchmark targets, and establish whether the market participant's security holdings and overall portfolio meet their aspirational target. The benchmark is a calculated value between "important" and "very important". Important is based on the 55th percentile score whereas very important is based on the 65th percentile score. For example, where the market participant selects one important and one very important value, the benchmark will be the quadratic mean of the two which is 60th percentile (i.e., $(65^2+55^2)/(65+55)$). Similarly, if a market participant selects two values as very important and one value as important the benchmark will be calculated as 62nd percentile $(65^2+65^2+55^2)/(65+65+55)$. Thus, a market participant who sets many values as important will find that their portfolio will achieve higher portfolio grades because the benchmark is low. On the other hand, if more values are set as very important the benchmark will be higher resulting in mediocre or poor portfolio grades.

At the security level, an "Impact Effect" is calculated which can be used as an indicator as to whether a specific company aligns with, conflicts with, or is neutral with respect to the market participant's overall impact values. The Impact Effect is based on the level of importance selected for each of the market participant's values along with the score of the security itself. In one embodiment, a security threshold can be set which specifies the minimum percentage of underlying data that must be available before the score for a particular security is calculated. For example, if a market participant selects four impact values and they are all on the same "Importance" level, then if the security threshold is set to 50%, at least two of them must have underlying data to calculate a score. Otherwise that security will be excluded.

Once the Impact Effect for all securities has been calculated, a portfolio impact score is created which reflects the weighted average of the Impact Effect score for each position in the market participant's portfolio. If this weighted score is greater than the benchmark score derived from the preference selected, the portfolio receives an "A" grade. If the weighted score is lower, the portfolio receives a score of B, C, D or F depending how far the score is below the preference benchmark. The portfolio impact score is sourced based on three items of information: the market participant's portfolio holdings, the market participant's preferences and the impact scores for the securities in such portfolio.

Figure 2:
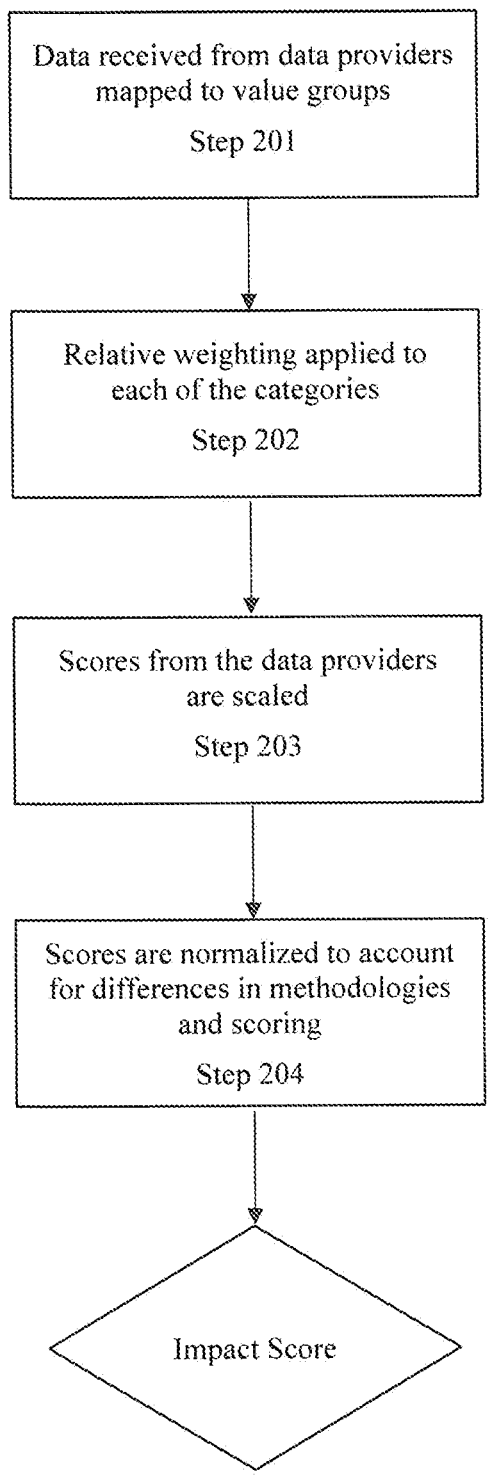
FIG. 2 is a flow diagram of the normalization process according to one embodiment of the present invention.

As will be discussed in more detail below and as shown in FIG. 2, in certain embodiments the data from one or more of the sources is transformed to arrive at a single score that reflects all data sources. First in Step 201 the data received from the data providers (e.g., Refinitiv's 10 categories; Truvalue's 26 categories) is mapped to the value groups (e.g., the 13 value groups). Once the mapping has been applied, in Step 202 if multiple categories are implicated, a relative weighting is applied to each of the categories. In one embodiment, in Step 203 the scores from the various data providers are scaled to account for differences and to make sure that the data sources being compared and used in the final score are comparable. Once the scores have been mapped and scaled, the scores are normalized in Step 204 to account for differences in the data providers' methodologies and scoring and arrive on a final impact score that can be used by the market participant. The result is converting disparate data sets, with different scoring, preferably into a standardized format in terms of mean and standard distribution. In other words, for each data set, a certain score (e.g., 50 out of 100) should have the same meaning.

First, the data provider's data needs to be mapped to match the impact value groups (Step 201). For example, "Pure Water," is a designated impact value group that may not be in a data provider's score. Accordingly, the scores and values need to be mapped. For example, for Refinitiv, Pure Water may be mapped to the Environmental pillar and for Truvalue it may be mapped to the following four SASB categories: Waste & Hazardous Materials Management, Water & Wastewater Management, Ecological Impacts Human Rights & Community Relations. Once the mapping has been applied, if multiple categories are implicated, a relative weighting is applied to the categories (Step 202). The percentage of weighting, as can be appreciated by one of skill in the art, is a design choice that can be altered depending on various factors (e.g., including equal weighting or some other weighting).

For example, for Pure Water a weighting of the four mapped categories (i.e., Waste & Hazardous Materials Management, Water & Wastewater Management, Ecological Impacts, and Human Rights & Community Relations) of 30%, 30%, 20%, 20% is applied. In one embodiment, the more correlative that the category is to the value group, the more weight it is given. This allows for a more accurate mapping of the various categories to the value group. In one embodiment, if a data provider's score is based on published articles (sources) (as is the case for Truvalue), a threshold can be applied whereby scores that are not supported by the threshold (or more) number of published articles can be minimized. For example, if fewer than four articles support a Truvalue SASB category, that category can be removed from the weighting and the remaining categories rebalanced. For example, if Ecological Impacts, is based on fewer than four articles, then the score for this category is disregarded and its 20% weighting could be reallocated to the other three categories, such as 37.5%, 37.5%, and 25%, respectively.

In one embodiment, the scores from the various data providers have to be scaled to account for differences and to make sure that the data sources being compared and used in the final score are comparable (Step 203). In this example the data needs to be scaled to have a bell curve (normal) distribution so that a score of 50 represents the mean value for each data set. While Truvalue's scores are normal, Refinitiv scores are not and therefore need to be scaled to match the Truvalue distribution which has a standard deviation of 15. One tool to accomplish this is to use the Qnorm function in R, with the inputs being the target average (e.g., a mean of 50), target standard deviation (e.g., 15) and the Refinitiv data. The result will be that the numerical scores from the various data providers can all be used to create an impact score that properly reflects the data and scores received from the data providers. In one embodiment, the data is also Winsorized so that the effect of any outlier scores can be reduced.

As will be appreciated by those skilled in the art, in the foregoing embodiment, the data from one source (Refinitiv) is scaled to the distribution of another data source (Truvalue). In alternate embodiments, however, rather than scaling one or more data sets to another one of the data sets, the data (and scores) from each data provider may be scaled to another, desired distribution (e.g., a determined standard deviation and mean).

Once the scores have been mapped and scaled, they need to be normalized so as to arrive on a final impact score that can be used by the market participant (Step 204). To generate the final impact score the average of the data provider scores are used. For example, if after weighting the scores for the categories that were mapped to Pure Water the Truvalue score for is 75 and the Refinitiv score after being scaled is 85, the final impact score for Pure Water is 80. If only one data provider has a mapped score, that score is used as the final impact score. If no data provider has provided a score, a general high level ESG score can be used. If no such high-level score is available, a "not applicable (N/A)" or other designation can be applied and no score given.

An example of a calculation for a sample market participant portfolio will now be described where the portfolio holdings and weight are:
Security A 80%,
Security B 20%.
and the market participant sets their impact value settings to:
Sustainable Product Lifecycle—Important
Mindful Business Models—Very Important
All others are blank
Security A has the following impact scores:
Sustainable Product Lifecycle=41.82
Mindful Business Models=46.98
and Security B has the following impact scores:
Sustainable Product Lifecycle=61.82
Mindful Business Models=blank As discussed above, a market participant can tag a specific impact value as either "Important" or "Very Important". Alternatively, an impact can be left blank which implies no preference. These preferences have numerical values used throughout the calculations:
No preference=0
Important=55
Very Important=65

Impact Effect scores that are shown as Aligns with/is Neutral Toward/Conflicts with are based on thresholds. These thresholds are:

Aligns with scores are >=100%
Neutral toward scores are between >=70% and <100%
Conflicts with scores are <70%

As discussed above, portfolio can receive a score of A, B, C, D and F where A is the best and F is the worst. The portfolio score is based on a ratio between the weighted impact score for the security and the benchmark score. This weighted impact score is then mapped to a letter grade which for this calculation used the following thresholds:

A is >=95%
B is between >=80% and <95%
C is between >=65% and <80%
D is between >=55% and <65%
F is <55%

The benchmark score is the sum product of the numerical equivalence of the impact preferences. So in this example since there is one "important" and one "very important" impact preference and important=55 and very important=65 the sum of the impact preferences is 120. The benchmark calculation is therefore:

Benchmark score=55×(55/120)+65×(65/120)=60

For Security A the weighted impact score would be calculated as follows:

Weighted Impact Score=41.82*(55/120)+46.98*(65/120)=45

Next the ratio between the weighted impact score and the benchmark score is calculated as follows:

Ratio=45/60=75.0%

Since the ratio falls between 70-100% Security A is given a neutral rating.

The same calculation would need to be carried out for each holding in the portfolio to get the overall portfolio impact score. Where a security does not have data for a particular category a predetermined score based on any number of factors can be applied, or that category can just be ignored so as not to give it any weight.

Assuming that Security B has a weighted impact score of 50, the calculation of the portfolio impact score and portfolio ratio score would be:

Portfolio Impact Score=[Security *A*] 45*80%+[Security *B*] 50*20%=46

Portfolio Ratio Score=Portfolio Impact Score/Benchmark Score=46/62=75%

Based on this calculation the portfolio receives a C grade.

In one embodiment, the market participant is able to seamlessly—preferably with a single user input—swap a security currently held in the portfolio that has a relatively low impact score (or a negative impact on the market participant's overall portfolio score) with one that has a more preferred impact score (or one that will improve the overall portfolio score). In order to effectuate this, the market participant would be able to exchange all of its shares in the security already held for an equivalent amount (in dollar value) of another security. This swapping is preferably carried out in terms of dollar amount of the security as opposed to a share amount which enables the market participant to more easily manage and rebalance their portfolio. The orders to rebalance can be either a market order ("MKT"), which is an order to buy or sell the security at the current price, regardless of what that price is, or a Limit Order ("LMT"), which is an order to buy or sell the security at a specific price or better.

As part of this swap functionality, the request to sell the security that is in the portfolio and has a relatively low impact score is referred to as the "Parent" order, and the request to buy the new security is referred to as the "Child" order. In the present embodiment, the Parent order must be a request to sell a security and the Child order is a buy order for a particular cash quantity based on the cash value or proceeds of the Parent order. The cash value is calculated by multiplying the trade price and trade size of the Parent order, less commissions and other fees, and using that amount as the cash quantity of the corresponding Child order. In an alternate embodiment, the Child order may be for the full value of the Parent order, with the amount of the fees for the Parent order being replaced or covered by the participant's account balance or margin. In the present embodiment, both the Parent order and the Child order are traded in the same currency, but in alternate embodiments, a foreign exchange conversion (taking into account any fees) can be employed to trade securities in different currencies. In one embodiment, the system can store scores for each of the various securities and generate any change in scores based on the information that is stored. In other embodiments, the scores may be generated or imported as a security is selected and that score can then be used to calculate the revised portfolio impact score.

Certain embodiments may permit partial fills in connection with executing a swap. In one such embodiment, if the Parent order has a partial fill and is not completely closed, the Child order size (cash quantity) is linked to the partial fills of the Parent order (i.e., the aggregate proceeds of all partial fills). In other embodiments, multiple Child orders may be created and placed where the Parent order is partially filled. In such an embodiment, the initial Child order size (cash quantity) is tied to the proceeds of the initial Parent trade partial fill (reflecting any commissions or similar fees) and the system leaves open a Child order having an order size linked to the unfilled portion of the Parent order, thus generating and issuing multiple Child orders (e.g., successively) until the entire existing position is swapped. In another embodiment, a Child order is not issued until after the entire Parent order is filled.

As will be appreciated by those of skill in the art, certain embodiments have the technical benefit of enabling a market participant to enter a swap and thus rebalance their portfolio with a single user input. Such an implementation, for example, reduces time for entering trades and reduces the potential for errors or delays associated with entering multiple electronic orders, particularly where such orders are entered via an app via a mobile (wireless) device, such as a smartphone. For example, the system, having calculated an impact score for each security being held compares that individual score to the weighted average of all scores or the overall portfolio score, thus making a determination whether each individual security aligns with the user's impact values (e.g., is greater than the weighted average or portfolio score by a predetermined amount), is neutral towards the user's impact values (e.g., is within a predetermined range of the weighted average or portfolio score) or conflicts with the user's impact values (e.g., is less than the weighted average or portfolio score by a predetermined amount). The system may present the market participant with an indication of such relative impact each security has on the overall portfolio score and, for those securities that relatively conflicts with the user's impact values, present the market participant with suggested securities to swap for each such security being held that conflicts with the user's impact values.

The system identifies such suggested swap securities through a database look-up. Each security is associated with an industry code (e.g., Energy, Transportation). The system identifies the industry code for the currently held security to be swapped and then, based on that industry code, looks up (identifies) other securities with the same code. The system further identifies a subset of such securities based on their impact scores-namely, identifying those securities in the same industry having an impact score greater than that of the currently held security to be swapped.

In one embodiment, the system presents the market participant with a listing of potential suggestions for swapping securities. For example, the system can present the user with a list of securities that are sorted by the system based on impact scores so that the user can see which securities would most greatly increase the overall portfolio impact scores. Alternatively or additionally, the system can show the user in real time how each swap would affect the impact score of the participant's portfolio. In other words, the market participant can in real time see the various alternative impact scores that would be realized if particular swaps were effectuated. In certain embodiments the suggested securities for a swap also can be based on or displayed with factors in addition to impact score, such as whether the potential new security has a buy recommendation, PE or PEG ratio or any other criteria that may influence a market participant's decision to select that security for the swap.

Once the market participant selects a swap security, a swap trade is activated within the system, with a parent order and child order automatically created for, and associated with, the market participant's account. The entry for the Child stock order in database 125 points to the Parent order. For example, if Security A is being divested, closing a position of X shares, and the intent is to reinvest (swap) the proceeds into Security B, the order for Security B will contain two fields, the details of Parent order of Security A and the instruction to reinvest cash proceeds in Security B.

Once a swap is carried out, the portfolio impact score is dynamically recalculated. This allows a market participant to rebalance their portfolio and in real time recognize the change in social impact that the rebalancing has effectuated.

To summarize, in one embodiment, in order to carry out the swapping of securities the system goes through one or more of the following steps. A market participant selects a swap of securities to remove a security having a score that is detrimentally affecting the portfolio impact score from their portfolio. Next a swap trade is activated within the system, where database entries for a parent Order and child Order are created for, and associated with the market participant's account. The Parent order is then executed, and the proceeds of such trade are inserted into the child Order to purchase that dollar amount of the one or more new securities. It should be appreciated that the orders can either be market orders meaning that the request is to execute the order immediately or a limit order which ties the order to a specific price or better. Depending on the size of the Parent order, the new securities may be purchased in one or more Child orders until the amount realized from the Parent order is expended and the value of the portfolio is equivalent to the value prior to the swap trade. Once the swap transaction takes place, the portfolio impact score is recalculated to reflect the rebalancing of the portfolio. Moreover the swap trade can be for a market participant's entire position in a security or a partial position, if for example, the market participant only wants to sell off some of their position in the security, but maintain a lesser amount. Lastly, the swap can also be used to swap a short position whereby a market participant's position can be bought and offset by selling another of the market participant's long position.

It should be noted that the embodiments described may use multiple software modules for performing the various functions of the system, while other embodiments could be implemented using any number of modules, with any single module incorporating the functions of several, or all, of the modules. The precise design of the software and the programming language used may be designed differently within the scope of the present invention. The software modules can be created using art recognized programming languages, including but not limited to Python, C++, ASP, Java, C#, ASP.NET, or PHP or any combination of known or later developed programming languages that allow the functionality described.

The software functions described herein may be programmed via application software, system software or any combination thereof, and may be executable on one or more hardware components within the system, external to the system or some combination thereof. In some embodiments, system and/or application level software may reside on system hardware, various external customer computer systems, or some combination thereof.

Similarly, the implementation of various software functions described herein may at times overlap. In various embodiments, some software components may be stored in hardware residing within the system, external to the system or some combination thereof. For example, in some embodiments a software implementation may consist of a stand-alone application installed on a mainframe computer. In other embodiments, certain aspects may reside on customer hardware programmed to communicate with the trading system and method. Accordingly, the present invention should be understood to include those variations as would be understood by a person of ordinary skill in the art having the benefits of the present disclosure.

It will also be understood that the various embodiments of the present invention can be realized through a web-based centralized server architecture, a thin client, fat client, or peer-to-peer type arrangement which could be substituted for other system architecture and are within the scope of the present invention. Additionally, the programming described herein can be stored in a machine-readable form on a computer-readable medium, such as a CD-ROM, DVD or other storage medium, and distributed to users for installation on user computers. Alternatively, such programming can be downloaded via network. In either embodiment, communication with the system may be effected across known networks, such as the Internet.

It should be noted that references herein to phrases such as "one embodiment" or "an embodiment" mean that a particular feature, structure or characteristic described in connection with the embodiment is included in at least one embodiment of the invention. The phrases such as "in one embodiment" or "in certain embodiments" in various places in the specification are not necessarily, but can be, referring to the same embodiment. Use of the term "preferred" or "preferably" is intended to indicate a configuration, set-up, feature, process, or alternative that may be perceived by the inventor(s) hereof, as of the filing date, to constitute the best, or at least a better, alternative to other such configurations, set-ups, features, processes, or alternatives. In no way shall the use of the term "preferred" or "preferably" be deemed to limit the scope of the claims hereof to any particular configuration, set-up, feature, process, or alternative.

It will be further appreciated by those skilled in the art that the appended figures are purely illustrative, and that the system may be implemented in any number of ways, by the actual designers, as long as the functionality, as described above, stays intact.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention or the broad inventive concept thereof. Moreover, numerous modifications and changes may readily occur to those skilled in the art. Hence, it is not desired to limit the invention to the exact construction and operation shown and described and, accordingly, all suitable modification equivalents may be resorted to falling within the scope of the invention as claimed.

The invention claimed is:

1. A computer-implemented method for electronic securities trading based on environmental, social and governance (ESG) scoring, the method comprising:
    determining an ESG impact effect for each security in a market participant's portfolio based on an impact score of the respective security for one or more impact values selected by the market participant and an indicated importance of each of the selected impact values;
    generating an ESG portfolio impact score for the market participant's portfolio based on the market participant's portfolio holdings, the market participant's selected impact values and their indicated importance, and the impact scores for the securities in the market participant's portfolio;
    identifying, based on (i) the impact scores generated by processing ESG data from a plurality of data providers, (ii) the market participant's selected impact values and their indicated importance, and (iii) industry sector information, one or more alternative securities to a security in the market participant's portfolio that conflicts with the market participant's selected impact values, each alternative security having an impact score greater than that of the conflicting security;
    providing to a market participant terminal the one or more alternative securities to swap for the conflicting security;
    receiving from the market participant terminal a selected alternative security, wherein the selection is made via a single user input;
    activating a swap trade responsive to the single user input, by automatically generating and submitting to one or more electronic marketplaces an electronic sell order to sell the conflicting security and an electronic buy order to buy the selected alternative security;
    dynamically recalculating the ESG portfolio impact score responsive to the swap trade; and
    providing to the market participant terminal the recalculated ESG portfolio impact score, showing in real time the change in ESG impact that the swap trade has effectuated.

2. The method of claim 1, wherein the ESG data comprises non-standardized electronic ESG data for a plurality of securities, wherein the ESG data for each security comprise scores from the data providers in multiple ESG categories, at least one of the ESG categories being different between two or more data providers.

3. The method of claim 2, wherein the market participant's selected impact values are selected from a list of impact values, at least one of the listed impact values being different from the data providers' ESG categories.

4. The method of claim 3, wherein the list of impact values comprises at least one of Sustainable Product Lifecycle, Mindful Business Models, Clean Air, Pure Water, Ocean Life, Land Health, Ethical Leadership, Consumer Safety, Company Transparency, LGBTQ Inclusion, Gender Equality, Racial Equality, and Fair Labor and Thriving Communities.

5. The method of claim 3, wherein processing the ESG data comprises mapping the data providers' ESG categories to the listed impact values; scaling the scores from one or more of the data providers to a specified distribution; normalizing the mapped and scaled scores; and generating, for each security, a single impact score per listed impact value.

6. The method of claim 1, further comprising:
    receiving from the market participant terminal a selection of one or more practices from a list of practices that the market participant wants companies to avoid; and
    flagging those securities in the market participant's portfolio where the companies engage in the selected practices.

7. The method of claim 6, wherein the list of practices comprises at least one of Animal Testing, Business Ethics Controversies, Corporate Political Spending and Lobbying, Energy Intensive, Fossil Fuels, Greenhouse Emissions, Hazardous Waste, High Water Usage, Tobacco, Alcohol and Gambling, and Weapons and Gun Manufacturers.

8. The method of claim 1, wherein the impact effect determined for each security in the participant's portfolio is used to determine an indicator as to whether the underlying company aligns with, is neutral toward, or conflicts with the market participant's selected impact values.

9. The method of claim 1, wherein the ESG portfolio impact score is mapped to a letter grade of A, B, C, D, or F.

10. The method of claim 1, wherein the swap trade orders are market orders or limit orders.

11. The method of claim 1, wherein the sell order is to sell all or some of the market participant's shares in the conflicting security and the buy order is to buy a particular dollar amount of the selected alternative security based on the cash value of the sell order.

12. The method of claim 11, wherein fees are subtracted either from the dollar amount of the buy order, or from the market participant's account balance or margin.

13. The method of claim 11, wherein the swap trade is executed via partial fills, where multiple buy orders for the selected alternative security are generated and submitted.

14. The method of claim 13, wherein the multiple buy orders are submitted successively until all of the market participant's shares in the conflicting security are swapped.

15. The method of claim 13, wherein the multiple buy orders are not submitted until the entire sell order is filled.

16. The method of claim 1, wherein the one or more alternative securities are identified based on their industry codes and impact scores.

17. The method of claim 1, wherein the one or more alternative securities are provided to the market participant terminal in a list sorted based on their impact scores.

18. The method of claim 1, wherein the one or more alternative securities are provided to the market participant terminal showing in real time how each swap would affect the ESG portfolio impact score of the market participant's portfolio.

19. The method of claim 1, wherein the one or more alternative securities are identified based on or provided to the market participant terminal with additional factors or investment criteria.

20. The method of claim 1, further comprising:
receiving order execution information from the one or more electronic marketplaces, processing the execution information, and providing execution details to the market participant terminal.

\* \* \* \* \*